(12) United States Patent
Goyal et al.

(10) Patent No.: US 11,641,587 B2
(45) Date of Patent: May 2, 2023

(54) LOCATION OPTIMIZATION IN A COMMUNICATION NETWORK

(71) Applicant: International Business Machines Corporation, Armonk, NY (US)

(72) Inventors: Manoj Kumar Goyal, Bangalore (IN); Raghavendra Krishna Murthy, Bangalore (IN); Manjit Singh Sodhi, Bangalore (IN); Raghuveer Prasad Nagar, Kota (IN)

(73) Assignee: International Business Machines Corporation, Armonk, NY (US)

( * ) Notice: Subject to any disclaimer, the term of this patent is extended or adjusted under 35 U.S.C. 154(b) by 68 days.

(21) Appl. No.: 17/197,339

(22) Filed: Mar. 10, 2021

(65) Prior Publication Data

US 2022/0295292 A1  Sep. 15, 2022

(51) Int. Cl.
*H04W 16/18* (2009.01)
*H04W 28/02* (2009.01)
*H04B 17/318* (2015.01)
*H04W 4/029* (2018.01)

(52) U.S. Cl.
CPC .......... *H04W 16/18* (2013.01); *H04B 17/318* (2015.01); *H04W 4/029* (2018.02); *H04W 28/0289* (2013.01)

(58) Field of Classification Search
CPC . H04W 16/18; H04W 4/029; H04W 28/0289; H04B 17/318
USPC ........................................................ 370/329
See application file for complete search history.

(56) References Cited

U.S. PATENT DOCUMENTS

| | | | |
|---|---|---|---|
| 6,542,716 | B1 | 4/2003 | Dent |
| 9,491,603 | B2 | 11/2016 | Papakipos |
| 2013/0237254 | A1* | 9/2013 | Papakipos .............. G06Q 50/01 455/456.3 |
| 2015/0223015 | A1 | 8/2015 | Steiner |
| 2015/0327132 | A1 | 11/2015 | Shen |
| 2016/0204847 | A1 | 7/2016 | Ryu |
| 2017/0126833 | A1 | 5/2017 | Deluca |
| 2018/0181088 | A1* | 6/2018 | Kelly .................... G06F 9/5072 |
| 2019/0036630 | A1 | 1/2019 | Svennebring |
| 2019/0200244 | A1 | 6/2019 | Polepalli |
| 2020/0389387 | A1 | 12/2020 | Magzimof |

FOREIGN PATENT DOCUMENTS

| | | |
|---|---|---|
| CN | 105183136 A | 12/2015 |
| CN | 105230113 A | 1/2016 |
| CN | 108307289 A | 7/2018 |

(Continued)

OTHER PUBLICATIONS

LatLong.Net, "Latitude and Longitude Finder on Map Get Coordinates", pp. 1-6, <https://www.latlong.net/>.

(Continued)

*Primary Examiner* — Huy C Ho
(74) *Attorney, Agent, or Firm* — Aaron Pontikos

(57) ABSTRACT

An indication is received. The indication is for a wireless communication being made by a computing device. Responsive to receiving the indication, an optimized location to make the wireless communication is determined based on a location of the computing device and an optimized locations list. The optimized location is communicated to the computing device making the wireless communication.

20 Claims, 4 Drawing Sheets

(56) References Cited

FOREIGN PATENT DOCUMENTS

| KR | 101276387 B1 | 6/2013 |
| KR | 101450957 B1 | 10/2014 |
| WO | 2022188625 A1 | 9/2022 |

OTHER PUBLICATIONS

McDonald G., "New Technique Generates Free-Floating 3D Images, Just Don't Call It a Hologram", GADGETS, Published Jan. 24, 2018, pp. 1-6, <https://www.seeker.com/gadgets/new-technique-generates-free-floating-3d-images-just-dont-call-it-a-hologram>.

Sgouropoulos et al., "Counting and Tracking People In A Smart Room: An IoT Approach", ResearchGate, Conference Paper: Nov. 2015, DOI:10.1109/SMPA2015.7370087, pp. 1-6, <https://www.researchgate.net/publication/308852259>.

Huawei et al. "Solution for optimize user plane path based on multiple IP sessions", S2-J61639 SA WG2 Meeting #114 S2-J61639, Apr. 5, 2016, 3 pages.

"Patent Cooperation Treaty PCT Notification of Transmittal of the International Search Report and the Written Opinion of the International Searching Authority, or the Declaration", Applicant's file reference F22WM51, International application No. PCT/CN2022/077296, International filing date Feb. 22, 2022(Feb. 22, 2022), dated Apr. 27, 2022(dated Apr. 27, 2022), 9 pages.

"Tiktik App Can Help Find the Best Network in Your Area", Gadgets 360, downloaded from the Internet on Dec. 28, 2022, 8 pages, <https://gadgets.ndtv.com/apps/reviews/tiktik-app-can-help-find-the-best-network-in-your-area-1762008>.

\* cited by examiner

LOCATION OPTIMIZATION IN A COMMUNICATION NETWORK

BACKGROUND

The present invention relates generally to the field of communication networks, and more particularly to optimized locations for signal quality in a communication network.

A communication network where the last link is wireless is also known as a cellular network or mobile network. The network, and specifically the last wireless link, is spread over a physical area in cells. Each cell is served by at least one fixed-location transceiver (i.e., cell tower). Each transceiver may be for one provider or multiple providers. The network allows for wireless communication by devices including, but not limited to, mobile phones, tablets, laptop, pagers, etc. as long as they have a portable transceiver included within the device or attached (physically or wirelessly) to the device.

SUMMARY

Embodiments of the present invention disclose a computer-implemented method, a computer program product and a system for fireless communication. In one embodiment, an indication is received. The indication is for a wireless communication being made by a computing device. Responsive to receiving the indication, an optimized location to make the wireless communication is determined based on a location of the computing device and an optimized locations list. The optimized location is communicated to the computing device making the wireless communication.

DETAILED DESCRIPTION

The present invention provides a method, computer program product, and computer system for determining optimized locations for communication in a network and providing the determined optimized locations to a computing device. Embodiments of the present invention recognize that when a user makes a data transfer on their computing device, including, but limited to, a text message, voice call, video call, etc. the user may have poor service from the network due to the physical location of the computing device being used to make the data transfer. Embodiments of the present invention recognize that many users may move around physical areas trying to find more optimal physical locations for their computing device to have a better signal to connect to the network and therefore be able to have a better data connection with the network.

Embodiments of the present invention provide for a program to determine optimal locations for data transfer and then provide these optimal locations to a computing device of a user. Embodiments of the present invention provide for the computing device to provide direction to the user on how to physically get to the determined optimal locations. Embodiments of the present invention provide for a program that learns optimal locations in a wireless communication network that could be a telecommunication network or Wi-Fi network to determine the optimal or best location to make a data transfer.

Figure 1:
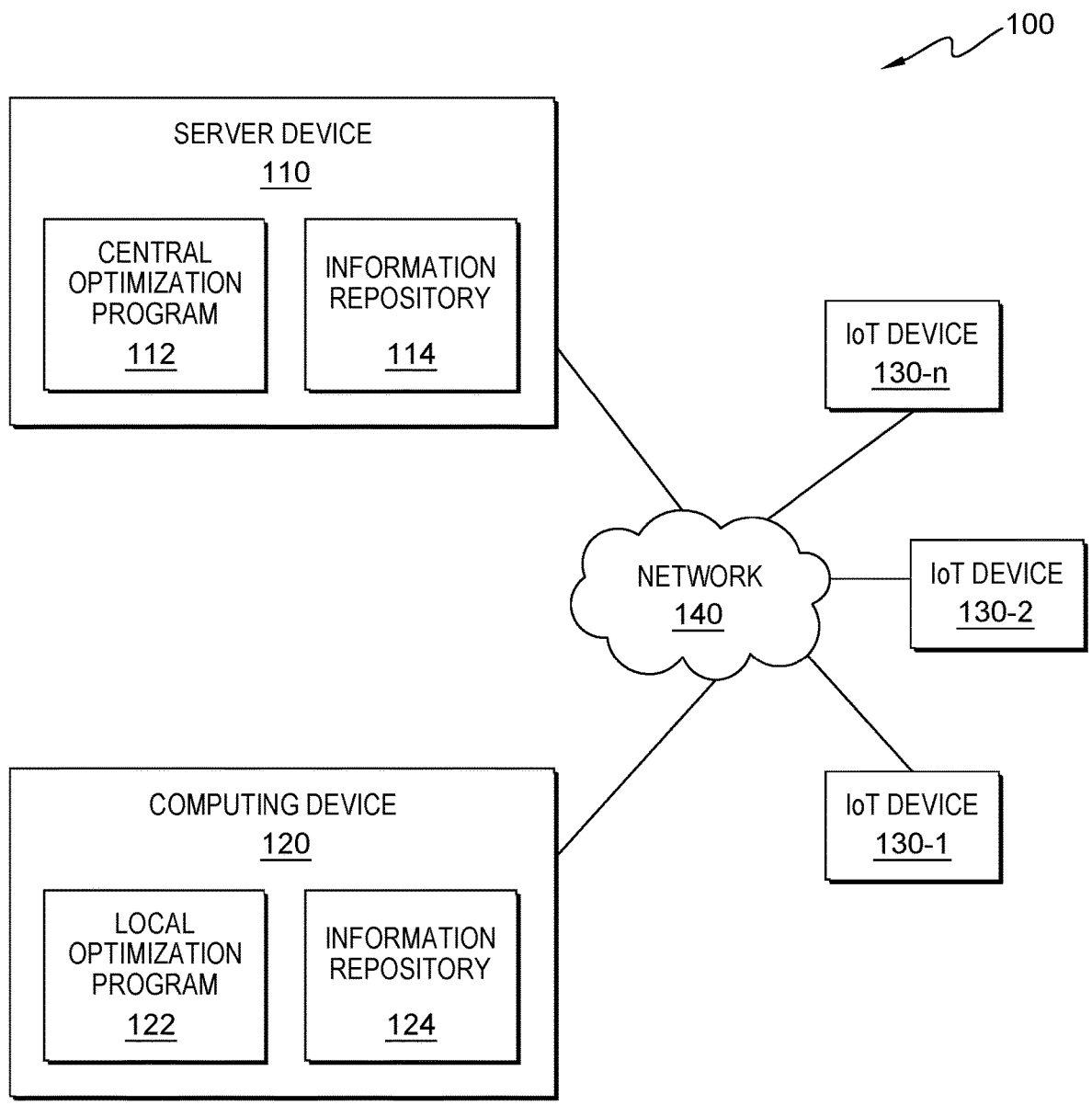
FIG. 1 is a functional block diagram of a network computing environment, generally designated 100, suitable for operation of central optimization program 112, in accordance with at least one embodiment of the invention.

Referring now to various embodiments of the invention in more detail, FIG. 1 is a functional block diagram of a network computing environment, generally designated 100, suitable for operation of central optimization program 112 and local optimization program 112, in accordance with at least one embodiment of the invention. FIG. 1 provides only an illustration of one implementation and does not imply any limitation with regard to the environments in which different embodiments may be implemented. Many modifications to the depicted environment may be made by those skilled in the art without departing from the scope of the invention as recited by the claims.

Network computing environment 100 includes server device 110, computing device 120, and IoT Device(s) 130-1 to 130-n interconnected over network 140. In embodiments of the present invention, network 140 can be a telecommunications network, a local area network (LAN), a wide area network (WAN), such as the Internet, or a combination of the three, and can include wired, wireless, or fiber optic connections. Network 140 may include one or more wired and/or wireless networks that are capable of receiving and transmitting data, voice, and/or video signals, including multimedia signals that include voice, data, and video formation. In general, network 140 may be any combination of connections and protocols that will support communications between server device 110, computing device 120, IoT Device(s) 130-1 to 130-n, and other computing devices (not shown) within network computing environment 100.

In an embodiment, network 140 may include cellular towers that are part of a communication network that is a wireless cellular network. The cellular network may include "cells" that cover physical land areas with at least one fixed-location transceiver but may include three or more cellular sites and/or a base transceiver station. These fixed-location transceivers and/or base transceiver stations may provide for transmission of voice, data, and other types of content by connecting to the remaining communication devices that are part of network 140.

Server device 110 is a computing device that can be a laptop computer, tablet computer, netbook computer, personal computer (PC), a desktop computer, a personal digital assistant (PDA), a smartphone, smartwatch, or any programmable electronic device capable of receiving, sending, and processing data. In general, server device 110 represents any programmable electronic devices or combination of programmable electronic devices capable of executing machine readable program instructions and communicating with other computing devices (not shown) within computing environment 100 via a network, such as network 140.

In various embodiments of the invention, server device 110 may be a computing device that can be a standalone device, a management server, a web server, a media server, a mobile computing device, or any other programmable electronic device or computing system capable of receiving, sending, and processing data. In other embodiments, server device 110 represents a server computing system utilizing multiple computers as a server system, such as in a cloud computing environment. In an embodiment, server device 110 represents a computing system utilizing clustered computers and components (e.g., database server computers, application server computers, web servers, and media servers) that act as a single pool of seamless resources when accessed within network computing environment 100.

In an embodiment, server device 110 includes a user interface (not shown). A user interface is a program that provides an interface between a user and an application. A user interface refers to the information (such as graphic, text, and sound) a program presents to a user and the control sequences the user employs to control the program. There are many types of user interfaces. In one embodiment, a user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements.

In an embodiment, server device 110 includes central optimization program 112. Embodiments of the present invention provide for a central optimization program 112 for determining optimized locations. In an embodiment, central optimization program 112 receives one or more pieces of data. In an embodiment, central optimization program 112 determines optimized locations based on the received data. In an embodiment, central optimization program 112 determines if a threshold has been reached. In an embodiment, if a threshold has been reached, then central optimization program 112 transmits the optimized locations. In an embodiment, if a threshold has not been met, then central optimization program 112 receives data.

In an embodiment, server device 110 includes information repository 114. In an embodiment, information repository 114 may be managed by central optimization program 112. In an alternative embodiment, information repository 114 may be managed by the operating system of server device 110, another program (not shown), alone, or together with, central optimization program 112. Information repository 114 is a data repository that can store, gather, and/or analyze information. In some embodiments, information repository 114 is located externally to server device 110 and accessed through a communication network, such as network 140. In some embodiments, information repository 114 is stored on server device 110. In some embodiments, information repository 114 may reside on another computing device (not shown), provided information repository 114 is accessible by server device 110. In an embodiment, information repository 114 may include location information that includes, but is not limited to, signal strength, season of the year, weather condition, type of location, azimuth angle, determine network congestion at a given point of time for the location, effectiveness of the completed calls at a given point in time for the location, and historical success rate at a given point in time. In an embodiment, information repository 114 may include optimized locations list, physical layout information for parts of network 140 (i.e., wireless network layout, tower layout, cell structure, etc.), and carrier information.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, information repository 114 may be implemented with any suitable storage architecture known in the art, such as a relational database, an object-oriented database, or one or more tables.

Computing device 120 is a computing device that can be a laptop computer, tablet computer, netbook computer, personal computer (PC), a desktop computer, a personal digital assistant (PDA), a smartphone, smartwatch, or any programmable electronic device capable of receiving, sending, and processing data. In general, computing device 120 represents any programmable electronic devices or combination of programmable electronic devices capable of executing machine readable program instructions and communicating with other computing devices (not shown) within computing environment 100 via a network, such as network 140.

In various embodiments of the invention, computing device 120 may be a computing device that can be a standalone device, a management server, a web server, a media server, a mobile computing device, or any other programmable electronic device or computing system capable of receiving, sending, and processing data. In other embodiments, computing device 120 represents a server computing system utilizing multiple computers as a server system, such as in a cloud computing environment. In an embodiment, computing device 120 represents a computing system utilizing clustered computers and components (e.g., database server computers, application server computers, web servers, and media servers) that act as a single pool of seamless resources when accessed within network computing environment 100.

In an embodiment, computing device 120 includes a user interface (not shown). A user interface is a program that provides an interface between a user and an application. A user interface refers to the information (such as graphic, text, and sound) a program presents to a user and the control sequences the user employs to control the program. There are many types of user interfaces. In one embodiment, a user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements.

In an embodiment, computing device 120 includes local optimization program 122. Embodiments of the present invention provide for a local optimization program 122 for applying optimized locations. In an embodiment, local optimization program 122 receives an indication. In an embodiment, local optimization program 122 determines an optimized location. In an embodiment, local optimization program 122 communicates an optimized location. In an embodiment, local optimization program 122 provides data to central optimization program 112.

In an embodiment, computing device 120 includes information repository 124. In an embodiment, information repository 124 may be managed by local optimization program 122. In an alternative embodiment, information repository 124 may be managed by the operating system of computing device 120, another program (not shown), alone, or together with, local optimization program 122. Information repository 124 is a data repository that can store, gather, and/or analyze information. In some embodiments, information repository 124 is located externally to computing device 120 and accessed through a communication network, such as network 140. In some embodiments, information repository 124 is stored on computing device 120. In some embodiments, information repository 124 may reside on another computing device (not shown), provided information repository 124 is accessible by computing device 120. In an embodiment, information repository 124 may include location information that includes, but is not limited to, signal strength, season of the year, weather condition, type of location, azimuth angle, determine network congestion at a given point of time for the location, effectiveness of the completed calls at a given point in time for the location, and historical success rate at a given point in time. In an embodiment, information repository 124 may include optimized locations and carrier information.

Information repository 124 may be implemented using any volatile or non-volatile storage media for storing information, as known in the art. For example, information repository 124 may be implemented with a tape library, optical library, one or more independent hard disk drives, multiple hard disk drives in a redundant array of independent disks (RAID), solid-state drives (SSD), or random-access memory (RAM). Similarly, information repository 124 may be implemented with any suitable storage architecture known in the art, such as a relational database, an object-oriented database, or one or more tables.

IoT device 130-1, 130-2, and 130-n in the broadest terms is any device able to connect to network 140 and able to transmit data to/from network 140. In an embodiment, IoT Device 130-n may be any number of IoT Devices. In other words, for ease of discussion, only three IoT device 130 are shown in network computing environment 100, however, there may be an any number of IoT device 130-n that communicate in network computing environment 100. In an embodiment, IoT device 130-n may be a computing device that can be a laptop computer, tablet computer, netbook computer, personal computer (PC), a desktop computer, a personal digital assistant (PDA), a smartphone, smartwatch, or any programmable electronic device capable of receiving, sending, and processing data. In general, computing device 120 represents any programmable electronic devices or combination of programmable electronic devices capable of executing machine readable program instructions and communicating with other computing devices (not shown) within computing environment 100 via a network, such as network 140. In an embodiment, IoT device 130-n may collect and/or transmit any number of data, including, but not limited to, signal strength, season of the year, weather condition, type of location, azimuth angle, network congestion at a given point of time for the location, effectiveness of the completed calls at a given point in time for the location, and historical success rate at a given point in time. In an embodiment, IoT device 130-n may record packet loss for communication done on IoT device 130-n.

Figure 2:
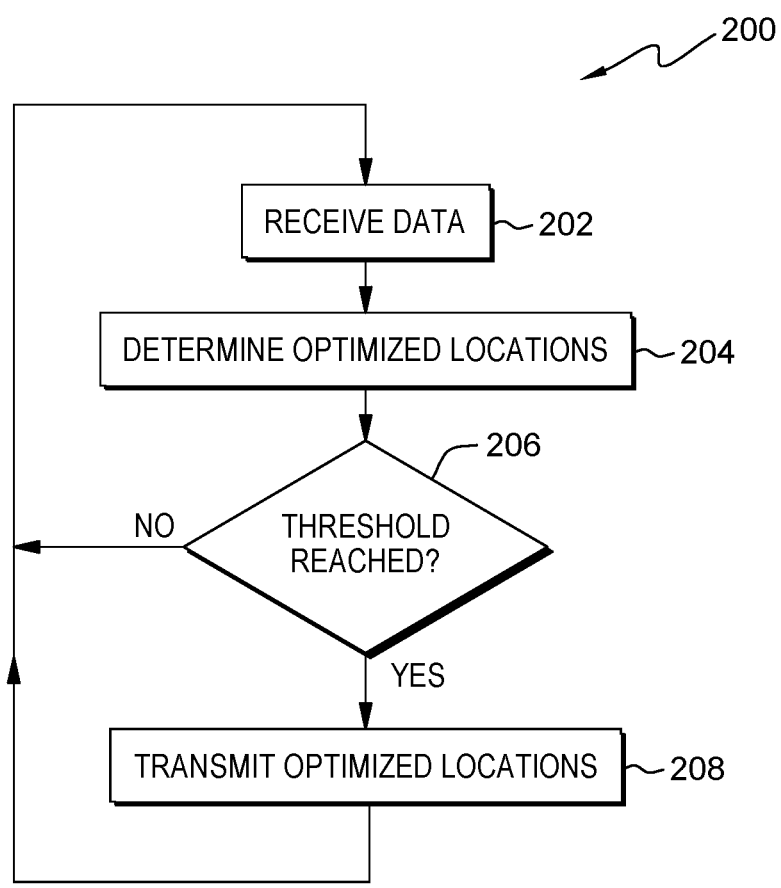
FIG. 2 is a flow chart diagram depicting operational steps for central optimization program 112 for determining optimized locations, in accordance with at least one embodiment of the invention.

FIG. 2 is a flow chart diagram of workflow 200 depicting operational steps for central optimization program 112 for determining optimized locations in accordance with at least one embodiment of the invention. In an alternative embodiment, the steps of workflow 200 may be performed by any other program (not shown) while working with central optimization program 112. It should be appreciated that embodiments of the present invention provide at least for determining optimized locations. However, FIG. 2 provides only an illustration of one implementation and does not imply any limitations with regard to the environments in which different embodiments may be implemented. Many modifications to the depicted environment may be made by those skilled in the art without departing from the scope of the invention as recited by the claims. In a preferred embodiment, a user, via a user interface (not shown), can invoke workflow 200 upon a user wanting to determine optimized locations for making data (i.e. audio, video, etc.) transfer in network 140.

Central optimization program 112 receives data (step 202). At step 202, RDBMS 112 receives data from one or more of computing device 120, IoT device 130-1, IoT device 130-2, or and IoT device 130-n. In an embodiment, the data may be received via network 140 and stored in information repository 114. In an embodiment, the data for each device may include, but is not limited to, signal strength, season of the year, weather condition, type of location, azimuth angle, determine network congestion at a given point of time for the location, effectiveness of the completed calls at a given point in time for the location, and historical success rate at a given point in time.

In an embodiment, signal strength is measured in dBm (a unit of level used to indicate that a power level is expressed in decibels with reference to one milliwatt), with 0 dBm being no signal and the larger the negative dBm (for example −50 dbm) the better the signal strength. In an embodiment, the signal strength may be a one time signal strength at time of sending the data, a signal strength recorded at certain locations the device has been located, an average signal strength during a data transfer on the device, or any combination. In an embodiment, season of the year is selected from spring, summer, fall, winter based on the date the data was sent. In an embodiment, the weather conditions may be recorded on the device when information is sent to central optimization program 112. In an alternative embodiment, when central optimization program 112 receives information about data that was sent through network 140, central optimization program 112 may work with another program (i.e. a weather program), not shown, to determine the weather conditions at the location where the data was transferred from the computing device and/or IoT device. In an embodiment, weather conditions include, but are not limited to, temperature, storms in the area, lightening in the area, rain in the area, and humidity. In an embodiment, the type of location may include, but is not limited to, indoor or outdoor. In an embodiment, the azimuth angle includes, but is not limited to, the position, height, and horizontal orientation of the communication device (i.e. antenna) found in the computing device 120 or IoT device 130-n.

In an embodiment, the determined network congestion at a given point in time is based on the queuing delay and packet loss within network 140, and more specifically at the end node (i.e. cell tower) of network 140 that is directly communicating with the deice. In an embodiment, the effectiveness of the completed calls at a given point in time may be based on natural language processing of the data transfer. For example, if the user expresses frustration that the call was very poor quality or if the user cannot hear the other user they are talking to states "Can you hear me?" In an embodiment, the historic success rate is measure of seamless usage of the available network without any recorded loss of packet/queuing delay. In an embodiment, the more instances of that location co-ordinates recording the location as optimal is factor that tells the success rate is good.

In an embodiment, central optimization program 112 may receive input from a user via their computing device 120 or IoT device 130-n regarding the effectiveness and/or success of the data transfer. In an embodiment, the user input may be binary (i.e. good or bad). In an alternative embodiment, the user input may be scaled (i.e. 0-100, 0 being bad, 100 being good).

Central optimization program 112 determines optimized locations (step 204). At step 204, central optimization program 112 uses matrix factorization to determine optimized locations using the data received in step 202. In an embodiment, central optimization program 112 may determine a single optimized location for all data received. In an alternative embodiment, central optimization program 112 may determine one or more optimizes locations for a physical area covered by an end node (i.e. cell tower) of network 140. In yet another alternative embodiment, central optimization program 112 may determine one or more optimized locations for a physical area. In an embodiment, the physical area may be covered by one or more end nodes (i.e. cell tower(s)) of network 140. In an embodiment, if a larger amount of devices provide data to central optimization program 112 that indicate a location is either good or bad for data transfer through network 140, a confidence level will increase regarding the accuracy of that physical location for data transfer. In an embodiment, the determine optimized locations are in a list by area.

Central optimization program 112 determines whether a threshold has been reached (decision step 206). In an embodiment, the threshold may be a time threshold. In other words, has a time threshold been met. In an alternative embodiment, the threshold may be a number of data points. In other words, has a threshold amount of new data been added. In yet another alternative embodiment, the threshold may be a number of changes to determined optimized locations. In other words, has a threshold number of determined optimized locations changed location relative to the previous location of the determined optimized locations. For example, has determined optimized location A moved a threshold amount (i.e. 500 feet). In an embodiment, if central optimization program 112 determines a threshold has not been reached (decision step 206, no branch), processing proceeds to step 202. In an embodiment, if central optimization program 112 determines a threshold has been reached, (decision step 206, yes branch), processing proceeds to step 208.

Central optimization program 112 transmits optimized locations (step 210). In an embodiment, central optimization program 112 may transmit the optimized locations in response to a request from computing device 120. In an embodiment, central optimization program 112 may transmit the optimized locations to all computing devices that opt-into receiving optimized locations from central optimization program 112. In an embodiment, central optimization program 112 may transmit the optimized locations in response to a query from local optimization program 122, discussed below, and a threshold does not necessarily have to be reached.

In an embodiment, central optimization program 112 may transmit all optimized locations that central optimization program 112 determines. In an embodiment, central optimization program 112 may transmit the optimized locations for the last end node (i.e. cell tower) of network 140 the computing device 120 was connected to. In an embodiment, central optimization program 112 may transmit the optimized locations withing a threshold distance of the location of computing device 120.

Figure 3:
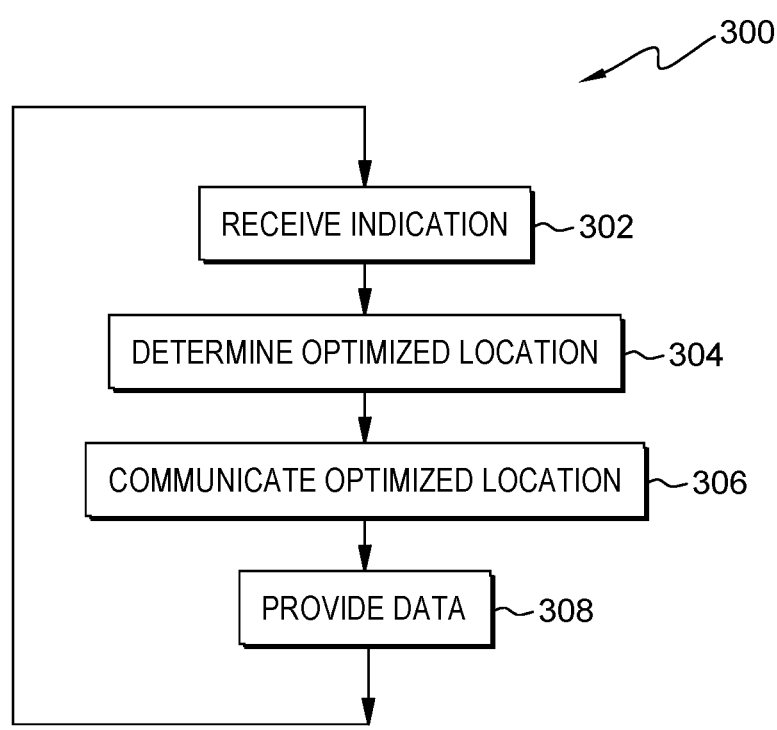
FIG. 3 is a flow chart diagram depicting operational steps for local optimization program 122 for applying optimized locations, in accordance with at least one embodiment of the invention.

FIG. 3 is a flow chart diagram of workflow 300 depicting operational steps for local optimization program 122 for applying optimized location in accordance with at least one embodiment of the invention. In an alternative embodiment, the steps of workflow 300 may be performed by any other program (not shown) while working with local optimization program 122. It should be appreciated that embodiments of the present invention provide at least for applying optimized location. However, FIG. 3 provides only an illustration of one implementation and does not imply any limitations with regard to the environments in which different embodiments may be implemented. Many modifications to the depicted environment may be made by those skilled in the art without departing from the scope of the invention as recited by the claims. In a preferred embodiment, a user, via a user interface (not shown), can invoke workflow 300 upon a user wanting to determine an optimized location.

Local optimization program 122 receives an indication (step 302). In a first embodiment, a user, via user interface (not shown) on computing device 120, indicates to local optimization program 122 to determine an optimized location to make a data transfer (i.e. text message, voice call, video call, etc.). In an alternative embodiment, local optimization program 122 receives an indication from another program (not shown) indicating that signal strength is below a threshold amount. In other words, there is poor signal. In an embodiment, these indications may be done before, during, or after the data transfer event.

Local optimization program 122 determines the optimized location (step 304). In an embodiment, local optimization program 122 may determine the optimized location by querying central optimization program 112 and receive the determined optimized locations via step 208. In an embodiment, local optimization program 122 may have previously received the determined optimized locations from central optimization program 112 and stored the determined optimized locations in information repository 124.

In an embodiment, local optimization program 122 may receive all determined optimized locations from central optimization program 112 and stored the determined optimized locations in information repository 124, as noted above. In this embodiment, local optimization program 122 may determine a specific optimized location based on the carrier being used by computing device 120 and/or based on the physical location of computing device 120 (i.e. what optimized location is closest to the physical location of computing device 120).

Local optimization program 122 communicates the optimized location (step 306). At step 306, local optimization program 122 communicates to the user and/or an IoT device 130-n the optimized location. In an embodiment, local optimization program 122 may communicate the coordinates of the determined optimized location to the user via the user interface. In other words, a visual and/or audible representation of the coordinates may be sent to the user via the user interface and/or computing device 120. In an embodiment, local optimization program 122 may communicate the coordinates of the determined optimized location to another program (not shown). For example, local optimization program 122 may communicate the coordinates to a mapping program on computing device 120 to provide directions to the determined optimized location. In an embodiment, local optimization program 122 may determine an IoT device 130-n closest to the determined optimized location and the IoT device 130-n may perform an indication of the determined optimized location including, but not limited to, audible indication, visual indication, holographic indication, etc. In an embodiment, the indication may include the service provider's tag for the wireless network in order to indicate to users that this location may be optimal for them if they are on that providers wireless network.

Local optimization program 122 provides data (step 308). At step 308, local optimization program 122 provides data to central optimization program 112. In an embodiment, step 308 is the providing step of data that is received in step 202. In other words, the provided data includes, but is not limited to, signal strength, season of the year, weather condition, type of location, azimuth angle, determine network congestion at a given point of time for the location, effectiveness of the completed calls at a given point in time for the location, and historical success rate at a given point in time. In an embodiment, local optimization program 122 may receive an indication from a user, via the user interface on computing device 120, that indicates a certain location that a data transfer was made was either good or bad for the data transfer. In an embodiment, this may be a binary decision (i.e. 1=good, 2=bad) or a scaled decision (i.e. 1-10, 1 being the best and 10 being the worst). In an embodiment, local optimization program 122 may perform natural language processing on the voice and/or written data transfer to determine if the user indicates the data transfer was positive or negative, similar to the indication received from the user, just discussed. In an embodiment, the natural language processing would be based on an opt-in system that only occurred upon a user opting into the service.

Figure 4:
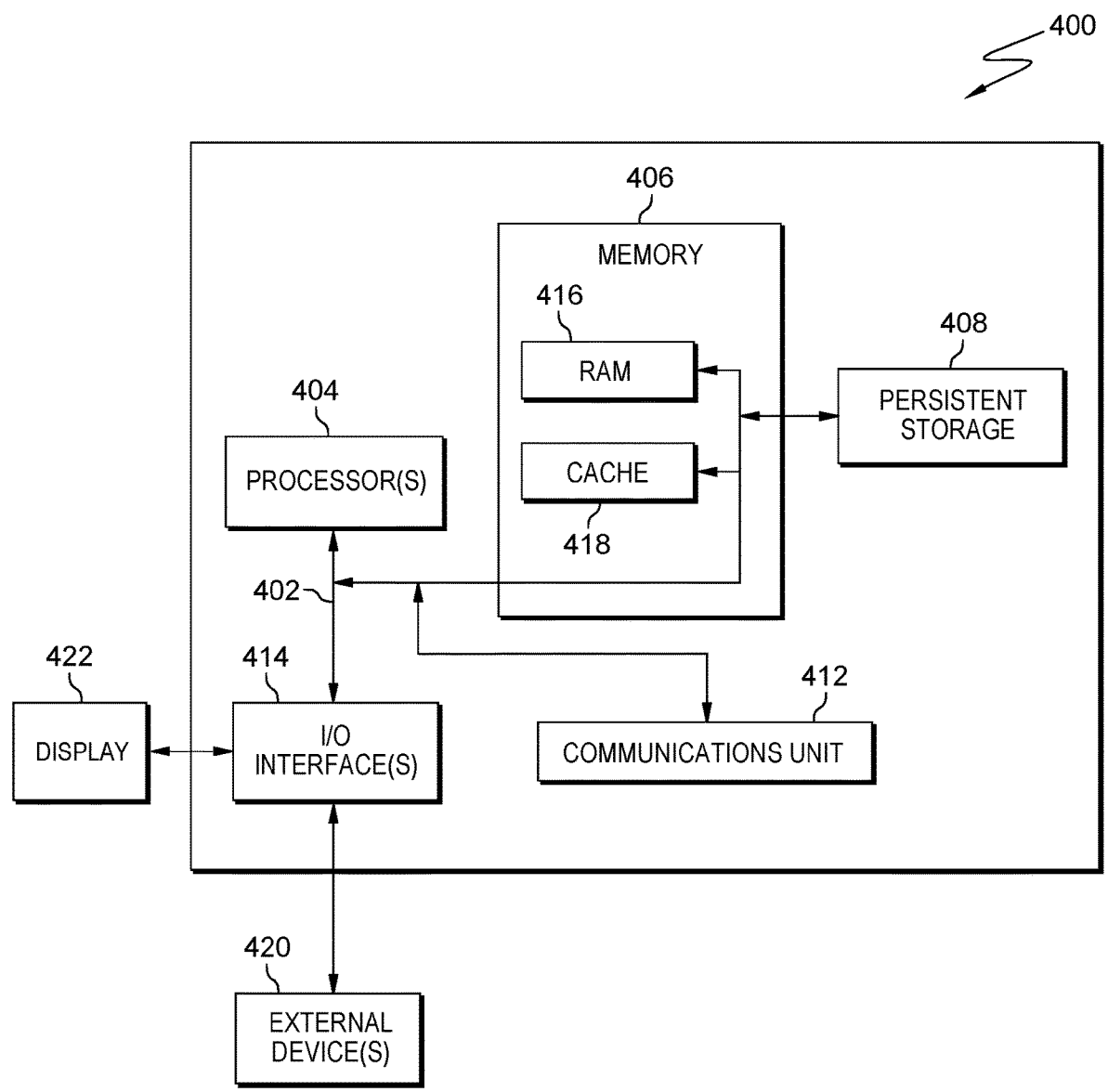
FIG. 4 is a block diagram depicting components of a computer, generally designated 400, suitable for executing central optimization program 112 and local optimization program 122, in accordance with at least one embodiment of the invention.

FIG. 4 is a block diagram depicting components of a computer 400 suitable for central optimization program 112 and local optimization program 122, in accordance with at least one embodiment of the invention. FIG. 4 displays the computer 400, one or more processor(s) 404 (including one or more computer processors), a communications fabric 402, a memory 406 including, a RAM 416, and a cache 418, a persistent storage 408, a communications unit 412, I/O interfaces 414, a display 422, and external devices 420. It should be appreciated that FIG. 4 provides only an illustration of one embodiment and does not imply any limitations with regard to the environments in which different embodiments may be implemented. Many modifications to the depicted environment may be made.

As depicted, the computer 400 operates over the communications fabric 402, which provides communications between the computer processor(s) 404, memory 406, persistent storage 408, communications unit 412, and input/output (I/O) interface(s) 414. The communications fabric 402 may be implemented with an architecture suitable for passing data or control information between the processors 404 (e.g., microprocessors, communications processors, and network processors), the memory 406, the external devices 420, and any other hardware components within a system. For example, the communications fabric 402 may be implemented with one or more buses.

The memory 406 and persistent storage 408 are computer readable storage media. In the depicted embodiment, the memory 406 comprises a random-access memory (RAM) 416 and a cache 418. In general, the memory 406 may comprise any suitable volatile or non-volatile one or more computer readable storage media.

Program instructions for central optimization program 112 and local optimization program 122 may be stored in the persistent storage 408, or more generally, any computer readable storage media, for execution by one or more of the respective computer processors 404 via one or more memories of the memory 406. The persistent storage 408 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by the persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of the persistent storage 408.

The communications unit 412, in these examples, provides for communications with other data processing systems or devices. In these examples, the communications unit 412 may comprise one or more network interface cards. The communications unit 412 may provide communications through the use of either or both physical and wireless communications links. In the context of some embodiments of the present invention, the source of the various input data may be physically remote to the computer 400 such that the input data may be received, and the output similarly transmitted via the communications unit 412.

The I/O interface(s) 414 allow for input and output of data with other devices that may operate in conjunction with the computer 400. For example, the I/O interface 414 may provide a connection to the external devices 420, which may be as a keyboard, keypad, a touch screen, or other suitable input devices. External devices 420 may also include portable computer readable storage media, for example thumb drives, portable optical or magnetic disks, and memory cards. Software and data used to practice embodiments of the present invention may be stored on such portable computer readable storage media and may be loaded onto the persistent storage 508 via the I/O interface(s) 414. The I/O interface(s) 414 may similarly connect to a display 422. The display 422 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adaptor card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, though the Internet using an Internet Service Provider). In some embodiments, electronic circuitry including, for example programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram blocks or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing form the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for wireless communication, the computer-implemented method comprising:
   receiving, by one or more computer processors, an indication, wherein the indication is for a wireless communication being made by a computing device;
   responsive to receiving the indication, determining, by one or more computer processors, an optimized location to make the wireless communication based on a location of the computing device and an optimized locations list; and
   communicating, by one or more computer processors, the optimized location to the computing device making the wireless communication.

2. The computer-implemented method of claim 1, wherein communicating, by one or more computer processors, the optimized location to the computing device making the wireless communication comprises:
communicating, by one or more computer processors, a physical coordinate of the optimized location based on a location of the wireless communication to a device making the wireless communication.

3. The computer-implemented method of claim 1, wherein communicating, by one or more computer processors, the optimized location to the computing device making the wireless communication comprises:
communicating, by one or more computer processors, a location indication of the optimized location based on a location of the wireless communication to an internet of things device, wherein the indication includes having the internet of things device provide a notification, and wherein the notification is selected form the list consisting of audible, visual, and holographic.

4. The computer-implemented method of claim 1, wherein the optimized locations list is created comprising:
receiving, by one or more computer processors, a plurality of data;
determining, by one or more computer processors, the optimized location list for a plurality of locations based on the plurality of data.

5. The computer-implemented method of claim 4, wherein a data of the plurality of data is selected from the group consisting of signal strength of the computing device, season of the year at the location of the computing device, weather condition at the location of the computing device, type of location of the location of the computing device, azimuth angle at the location of the computing device, determined network congestion at a given point of time for the location, effectiveness of a completed calls at a given point in time for the location, and historical success rate at a given point in time.

6. The computer-implemented method of claim 4, wherein the data is received from an internet of things device.

7. The computer-implemented method of claim 4, further comprising:
determining, by one or more computer processors, whether a threshold event has occurred;
responsive to determining the threshold event has not occurred, receiving, by one more computer processors, updated data; and
updating, by one or more computer processors, the optimized location list using the received updating data.

8. A computer program product for wireless communication, the computer program product comprising:
one or more computer readable storage media; and
program instructions stored on the one or more computer readable storage media, the program instructions comprising:
program instructions to receive an indication, wherein the indication is for a wireless communication being made by a computing device;
responsive to receiving the indication, program instructions to determine an optimized location to make the wireless communication based on a location of the computing device and an optimized locations list; and
program instructions to communicate the optimized location to the computing device making the wireless communication.

9. The computer program product of claim 8, wherein the program instructions to communicate the optimized location to the computing device making the wireless communication comprise program instructions to:
communicate a physical coordinate of the optimized location based on a location of the wireless communication to a device making the wireless communication.

10. The computer program product of claim 8, wherein the program instructions to communicate the optimized location to the computing device making the wireless communication comprise program instructions to:
communicate a location indication of the optimized location based on a location of the wireless communication to an internet of things device, wherein the indication includes having the internet of things device provide a notification, and wherein the notification is selected form the list consisting of audible, visual, and holographic.

11. The computer program product of claim 8, wherein the optimized list is created comprise program instructions to:
receive a plurality of data;
determine the optimized location list for a plurality of locations based on the plurality of data.

12. The computer program product of claim 11, wherein a data of the plurality of data is selected from the group consisting of signal strength of the computing device, season of the year at the location of the computing device, weather condition at the location of the computing device, type of location of the location of the computing device, azimuth angle at the location of the computing device, determined network congestion at a given point of time for the location, effectiveness of a completed calls at a given point in time for the location, and historical success rate at a given point in time.

13. The computer program product of claim 11, wherein the data is received from an internet of things device.

14. The computer program product of claim 11, further comprising one or more of the following program instructions, stored on the one or more computer readable storage media, to:
determine whether a threshold event has occurred;
responsive to determining the threshold event has not occurred, receive updated data; and
update the optimized location list using the received updating data.

15. A computer system for wireless communication, the computer system comprising:
one or more computer processors;
one or more computer readable storage media; and
program instructions, stored on the one or more computer readable storage media for execution by at least one of the one or more computer processors, the program instructions comprising:
program instructions to receive an indication, wherein the indication is for a wireless communication being made by a computing device;
responsive to receiving the indication, program instructions to determine an optimized location to make the wireless communication based on a location of the computing device and an optimized locations list; and
program instructions to communicate the optimized location to the computing device making the wireless communication.

16. The computer system of claim 15, wherein the program instructions to communicate the optimized location to the computing device making the wireless communication comprise program instructions to:

communicate a physical coordinate of the optimized location based on a location of the wireless communication to a device making the wireless communication.

17. The computer system of claim 5, wherein the program instructions to communicate the optimized location to the computing device making the wireless communication comprise program instructions to:

communicate a location indication of the optimized location based on a location of the wireless communication to an internet of things device, wherein the indication includes having the internet of things device provide a notification, and wherein the notification is selected form the list consisting of audible, visual, and holographic.

18. The computer system of claim 15, wherein the optimized list is created comprise program instructions to:

receive a plurality of data;

determine the optimized location list for a plurality of locations based on the plurality of data.

19. The computer system of claim 18, wherein a data of the plurality of data is selected from the group consisting of signal strength of the computing device, season of the year at the location of the computing device, weather condition at the location of the computing device, type of location of the location of the computing device, azimuth angle at the location of the computing device, determined network congestion at a given point of time for the location, effectiveness of a completed calls at a given point in time for the location, and historical success rate at a given point in time.

20. The computer system of claim 18, wherein the data is received from an internet of things device.

* * * * *